United States Patent
Munier et al.

(10) Patent No.: US 9,634,343 B2
(45) Date of Patent: Apr. 25, 2017

(54) HYDROGEN OFFLOADING IN AN ELECTROCHEMICAL GENERATOR UNIT INCLUDING A HYDROGEN FUEL CELL

(75) Inventors: Eric Munier, Montigny le Brettoneux (FR); Jean-Marie Bourgeais, Saint Forget (FR); Marion De Gentile, Clamart (FR)

(73) Assignee: POWIDIAN, Chambray les Tours (FR)

( * ) Notice: Subject to any disclaimer, the term of this patent is extended or adjusted under 35 U.S.C. 154(b) by 447 days.

(21) Appl. No.: 14/005,587

(22) PCT Filed: Mar. 6, 2012

(86) PCT No.: PCT/EP2012/053828
§ 371 (c)(1),
(2), (4) Date: Sep. 17, 2013

(87) PCT Pub. No.: WO2012/123290
PCT Pub. Date: Sep. 20, 2012

(65) Prior Publication Data
US 2014/0017580 A1      Jan. 16, 2014

(30) Foreign Application Priority Data
Mar. 17, 2011   (FR) ..................... 11 52220

(51) Int. Cl.
*H01M 8/04*   (2016.01)
*H01M 8/065*   (2016.01)
*H01M 8/04082*   (2016.01)
*H01M 8/18*   (2006.01)
*F17C 11/00*   (2006.01)

(52) U.S. Cl.
CPC ........... *H01M 8/065* (2013.01); *F17C 11/005* (2013.01); *H01M 8/04216* (2013.01); *H01M 8/186* (2013.01); *Y02E 60/321* (2013.01); *Y02E 60/324* (2013.01); *Y02E 60/528* (2013.01)

(58) Field of Classification Search
CPC ....................................................... H01M 8/04
See application file for complete search history.

(56) References Cited

U.S. PATENT DOCUMENTS

2003/0207161 A1*  11/2003  Rusta-Sallehy ....... H01M 8/065
                                                            429/410

* cited by examiner

*Primary Examiner* — Jacob Marks
(74) *Attorney, Agent, or Firm* — Steven M. Greenberg, Esq.; CRGO Law

(57) ABSTRACT

In order to make more specifically water autonomous a hydrogen cell electrochemical generating unit (10), the generating unit (1) comprises a condenser (13) provided with a fan (13V) and with a radiator (13R) in contact with a tank (12) stocking hydrogen into a hydride. The condenser simultaneously transfers heat from a steam filled air (17E) to an endothermic reaction of the hydride into an alloy and into hydrogen via the radiator and condenses the steam into condensation water (13EC) being collected by a tank (14) supplying an electrolysis facility (11) with water for producing the hydrogen to be stocked.

5 Claims, 1 Drawing Sheet

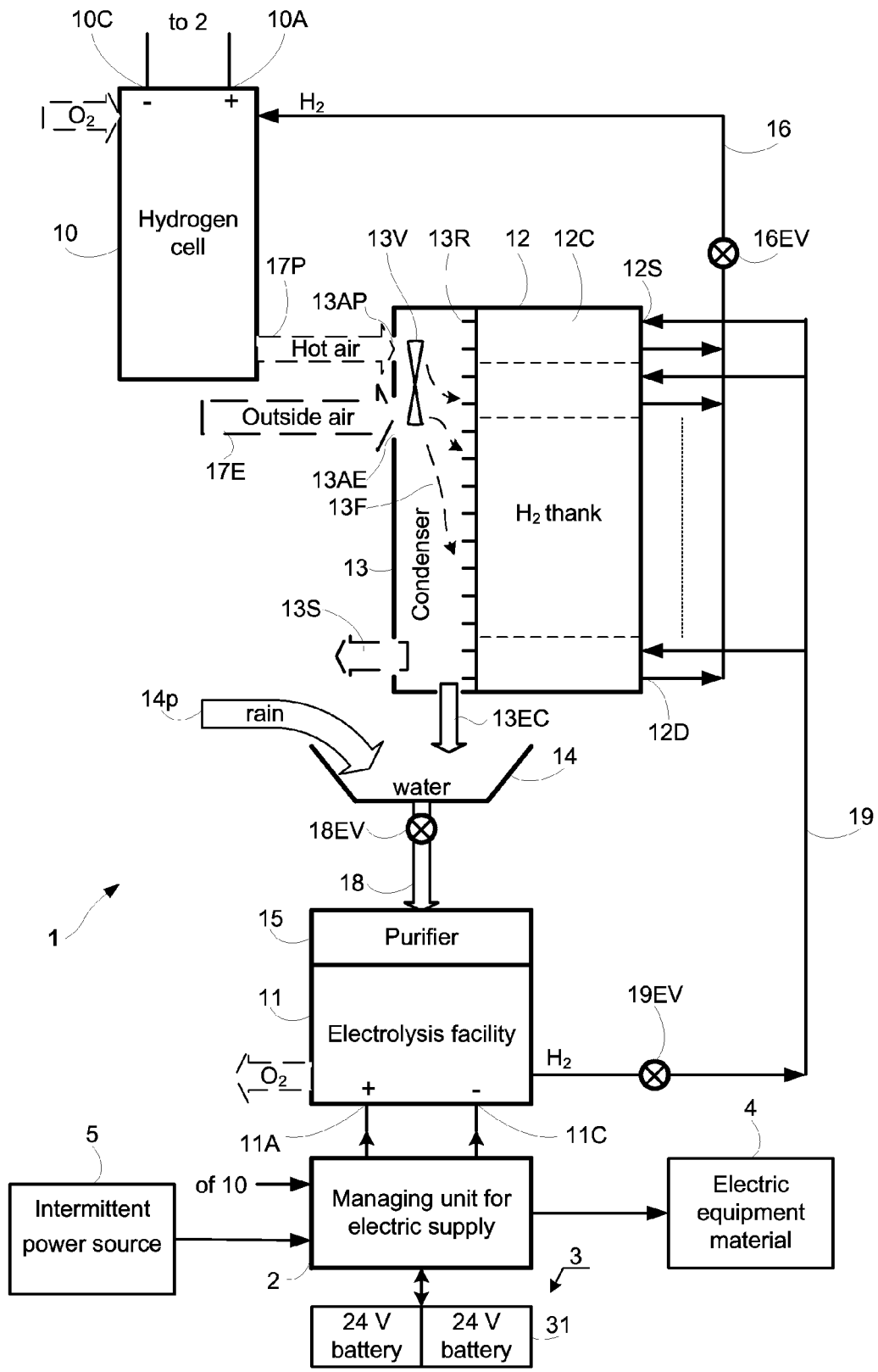

HYDROGEN OFFLOADING IN AN ELECTROCHEMICAL GENERATOR UNIT INCLUDING A HYDROGEN FUEL CELL

CROSS-REFERENCE TO RELATED APPLICATIONS

This application is a §371 national phase entry of International Application No. PCT/EP2012/053828, filed Mar. 6, 2012, which claims priority to French Patent Application No. 1152220, filed Mar. 17, 2011.

The present invention relates to an electrochemical generating unit comprising a hydrogen cell and a method for destocking hydrogen in such a unit.

The electrochemical generating unit comprises in addition to the hydrogen cell a stocking tank for stocking hydrogen. The stocking tanks are most often cylinders stocking hydrogen under a very high pressure. The cylinders should be refilled.

The hydrogen could be produced through water electrolysis for avoiding supplying fuel. In such a case, the hydrogen produced by an electrolysis facility should be compressed under a very high pressure and stocked in cylinders on site, requiring heavy, complex and expensive means being incompatible with a transportable electrochemical generating unit. Moreover, the regulation relative to stocking hydrogen under high pressure is restricting and stocking hydrogen should be secured through caretaking. A water supplying source should be provided on the site pour the operation of the electrolysis facility.

In order to overcome the drawbacks of stocking hydrogen in cylinders, hydrogen stocking tanks based on a reversible hydridation reaction have been recently developed. However an electrochemical generating unit comprising a hydrogen cell, an electrolysis facility and a hydrogen stocking tank of this type is not water autonomous for the electrolysis facility.

This invention aims at overcoming the above mentioned drawbacks so as to make, more specifically, water autonomous a hydrogen cell electrochemical generating unit.

To this end, a method for destocking the hydrogen stocked as a hydride, which simultaneously comprises a transfer of heat from a steam filled air to an endothermic reaction of the hydride into an alloy and into hydrogen and a condensation of the steam into condensation water, is characterized in that it comprises forcing the steam filled air on a heat exchanger in contact with the hydride, so that the transfer of heat from the steam filled air to the endothermic reaction is made easier through Thus, according to this invention, the water autonomy to supply to a electrolysis device in a hydrogen cell electrochemical generating unit is achieved thanks to a condensation of the steam being in suspension in the air on the installation site of the generating unit, into condensation water during destocking of hydrogen.

The alloy could be based on a rare earth and a metal.

In order to collect the water intended for the electrolysis device without water freezing, the decrease of the temperature of the steam filled air during the heat transfer should not be higher than the dew temperature of the air.

Depending on the climatic conditions on the installation site of the generating unit, the steam filled air could comprise in part steam filled hot air evolved by the hydrogen cell receiving the hydrogen being destocked.

The method could further comprise an electrolysis of the condensation water for producing the hydrogen to be stocked into the hydride, more particularly when the generating unit comprises an electrolysis facility.

This invention further relates to an electrochemical generating unit comprising a hydrogen cell and a stocking tank able to stock hydrogen into a hydride for destocking the hydrogen toward the cell. The generating unit is characterized in that it comprises a means able to cooperate with the stocking tank for simultaneously transferring heat from a steam filled air to an endothermic reaction of the hydride into an alloy and into hydrogen and condensing steam into condensation water.

According to a particular embodiment, said means able to cooperate with the hydrogen stocking tank could comprise a condenser for condensing the steam into condensation water, a heat exchanger being able to be in contact with the steam filled air in the condenser and with the hydride in the stocking tank, and a convection means in the condenser for forcing the steam filled air on the heat exchanger. In this embodiment there are also provided a water collector-tank for collecting the condensation water, and an electrolysis facility able to be supplied electrically so as to produce hydrogen to be stocked into the hydride in the stocking tank through electrolysis of the collected condensation water. A purifier could be provided for purifying the collected condensation water into purified water to be supplied to the electrolysis facility.

If the climatic conditions on the installation site of the generating unit are unsatisfactory for supplying wet enough air to the electrolysis facility, the convection means in the condenser could be able to force steam filled outside air and steam filled hot air evolved by the hydrogen cell on the heat exchanger.

As will be seen later on, the electrochemical generating unit could be used for overcoming a failure or an insufficient electric power generated by an intermittent electric power source, such as a renewable energy source or an electric distribution network, to supply an electric equipment material. In order to increase the lifetime of the hydrogen cell, the cell could be able to supply the electric equipment and to charge batteries upon destocking hydrogen as soon as the power of the batteries is at a first power threshold, such as a discharge threshold and this until the batteries charged by the cell reach a second power threshold, such as a full charge threshold, higher than a first threshold.

Additional characteristics and advantages of the present invention shall become readily apparent from reading the description that follows of several embodiments of this invention, given as non limitative examples, with reference to the corresponding accompanying drawings, in which FIG. 1 is a schematic block-diagram of a hydrogen electrochemical generating unit included in an electric supplying system.

With reference to FIG. 1, an electrochemical generating unit 1 comprises, as modules being able to be transportable, a hydrogen cell 10, an electrolysis facility 11, a hydrogen stocking tank 12, a condenser 13, a water tank-collector 14 and a water purifier 16.

According to the illustrated embodiment, the operation of the electrochemical generating unit 1 is managed by a managing unit 2 for an electric supply for managing the charge of an electric energy stocking module 3 comprising batteries 31 and the supply of an electric equipment material 4 and of the unit 1.

The electrical equipment material 4 operates as the electric charge of the electrochemical generating unit 1 and is for instance a telecommunications station operating in emitter and receiver for mobile terminals and communicating with at least one terrestrial equipment material for centralizing telecommunications or a telecommunication satellite. The equipment material 5 is permanently supplied under the control of the managing unit 2, with a variable operation electric power as a function of services provided by the equipment material. For instance, the equipment material is supplied under a continuous voltage of 48V corresponding to the nominal voltage in outlet of the batteries 31.

The hydrogen cell 10 is based, for instance, on proton exchange membrane PEM ("Proton Exchange Membrane") technology. The hydrogen as dihydrogen is discharged from the hydrogen stocking module 12 via a line 16 with a solenoid 16EV opened under the control of the managing unit 2, for being oxidized at the anode 10A of the cell. The oxygen coming from the ambient air is reduced on the cathode 10C of the cell with an ion exchange for supplying electric current in outlet of the cell 10 and the steam filled air in a line 17P able, according to an alternative, to be connected to the condenser 13.

Under the control of the managing unit 2, the electrolysis facility 11 could be supplied with electricity by the batteries 31. The electrolysis facility 11 is supplied with water by the tank-collector 14 through a line 18 having a solenoid centre 18EV opened under the control of the managing unit 2, and through the water purifier 15. The electrolysis facility operates at a low pressure and a low temperature so as to break down the water being collected and purified into oxygen and into hydrogen. At the anode 11A of the electrolysis facility, the oxygen escapes in the air. At the cathode 11C of the electrolysis facility, the hydrogen is produced under a low pressure so as to be stocked in the tank 12 via a line 19 having a solenoid valve 19EV opened under the control of the managing unit 2. For instance, the electrolysis facility 11 is compact and comprises a solid state electrolyte as a polymeric membrane PEM. The electrolysis of the water is triggered in the electrolysis facility 11 by a supply of electricity in outlet of the managing unit 2 managing the duration of the electrolysis and of the opening of the solenoid centres 18EV and 19EV until the hydrogen stocking tank 42 is full.

The hydrogen stocking tank 12 and the steam condenser 13 have the form of at least one container.

The tank 12 contains, for example, boxes 12C, that could have the form of cylinders and being stacked vertically according to the illustrated embodiment. Each box 12C has a stocking input 42S connected to the line 19 for stocking directly the hydrogen produced by the cathode 11C of the electrolysis facility 11 and a destocking outlet 12D connected to the line 16 for destocking directly the hydrogen toward the anode 10A of the cell 10. Alternatively, the inlet 42S and the outlet 42D are gathered into one single stocking/destocking mouth of the box.

The condenser 13 has for instance the form of a hollow metallic column, having in the high part an air intake inlet 13AE for admitting the ambient air 17E, and in the low part an air exhaust outlet 13S outside and a condensation water recovery outlet 13EC directed toward the water tank-collector 14. The condenser 43 contains an air forced convection system and a heat exchanger. The convection system for instance comprises an electric fan 13V controlled by the managing unit 2 and arranged in the high part before the air inlet 13AE. The heat exchanger has for instance the form of a radiator 13R having fins oriented toward the interior of the condenser 13 so as to be in contact with the ventilated air and a base making up a thermally conductive wall, for instance made in graphite, common to the condenser and to the boxes 12C of the stocking tank 12.

The water tank-collector 14 comprises a vessel for collecting through gravity the condensation water 13EC being produced by the condenser 13. Optionally, the tank-collector 14 collects rain water 14p. The tank-collector 14 is connected via the line 18 the solenoid valve 18EV of which is opened under the control of the managing unit 2 for supplying water to the purifier 15 and the electrolysis facility 11 when the latter is electrically supplied under the control of the managing unit 2 for producing the hydrogen to be stocked. The purifier 15 purifies the water being collected for meeting the water quality required by the electrolysis facility 11.

The hydrogen stocking tank 12 stocks directly the hydrogen produced by the electrolysis facility 11 and supplies directly hydrogen as an energetic vector to the hydrogen cell 10. The tank 12 is charged with the hydrogen produced at a low pressure typically of about ten bars by the electrolysis facility 11 via the solenoid valve 19EV opened under the control of the managing unit 2 in the line 19. Each box 12C in the tank 12 contains a rare earth and metal based alloy, such as an alloy of lanthane and nickel, in contact with the base of the radiator 13R.

Upon the exothermic stocking hydrogen, as the alloy having a high reversible mass adsorption capacity adsorbs the hydrogen produced by the electrolysis facility 11 so as to form a hydride substrate, such as the hydride $LaNi_5H_6$, with heat evolving outside. This direct stocking of the hydrogen being produced is not based on a compression of several hundreds of bars of the hydrogen as for stocking gaseous or liquid hydrogen in cylinders and has a very high energetic yield.

The hydridation reaction being reversible, the tank 12 destocks the hydrogen stocked through desorption by means of a transfer of the heat supplied by the air 17E admitted in the condenser 13 upon the endothermic reaction transforming the hydride into an alloy and hydrogen. The hydrogen is destocked under a lower destocking pressure and under a higher temperature, via the discharge line 16 with the solenoid valve 16EV opened by the managing unit 2. The destocking pressure of a few bars is lower than that of stocking hydrogen and substantially higher than the atmospheric pressure and corresponds to the pressure of the cell 10. The metal then switches from the hydride state to its original state ready to stock the hydrogen produced again. For destocking hydrogen, the fan 13V is started by the managing unit 2 so that the amount of heat necessary for the desorption is supplied by the relatively wet outside air 17E. The air 13F forced by the fan 13V in the condenser 13, for instance with a flow rate of approximately 1 $m^3/s$, cools down upon the contact with the fins of the radiator 13R the base of which is in contact with the hydride tapping the heat necessary to destocking endothermic hydrogen.

While the forced air 13F in the condenser is cooled down during the heat exchange with the hydride via the radiator 13R, the temperature of the air switches to a temperature of approximately 1° C. higher than the dew temperature of the air, without the condensation water reaches the freezing temperature and freezes, so as to convert the saturated steam into liquid water 13EC being recoverable by the tank-collector 14. A controller in the managing unit 2 is connected to a thermometer in the condenser 13 so as to check that the temperature at the surface of the radiator 13R does not reach 0° C.

The tank 12 and the condenser 13 are dimensioned so that the condenser supplies enough water to the electrolysis facility via the purifier 15 and so that the electrolysis facility supplies enough hydrogen to stock, so that the cell 10 rapidly supplies electric power to the batteries 31 to be recharged typically in a few hours, while supplying the equipment 4. Cyclically under the control of the managing unit 2, the batteries 31 are charged rapidly by the cell 40, and discharge slowly so as to supply the equipment material 4. The amount of heat tapped by the stocking tank 12 exceeds the water needs of the electrolysis facility for the production of hydrogen necessary to the operation of the cell while the batteries are recharged from a discharge power P3m to a full charge power P3M. For instance, while hydrogen is destocked, 3 liters of condensation water approximately could be produced within only approximately 60 minutes and will be used for the production of 3.75 $Nm^3$ (Normal Cubic Meter) of hydrogen by the electrolysis facility. The hydrogen consumption of the cell for 4 kW for 3 hr is approximately 11 $Nm^3$ and allows the generation of 9 liters of condensation water approximately as well as the production of 12 kWh for rapidly recharging the batteries. A renewable water supply, upon the yearly maintenance of the unit 1, could be provided for this alternative.

Alternatively, if the hygrometry and/or the temperature of the air on the installation site of the system 1 are too low or become too low, the heat supplied by the outside air 17E and to be tapped by the tank 12 via the radiator 13R while destocking could be supplemented with the flow of hot steam filled air 17P evolved by the chemical reaction in the cell 10 being in service upon destocking. In such an alternative, the hot steam filled air 17P is brought from the cell 10 via a line to an intake inlet 13AP of the condenser 13 before the fan 13V. The steam produced by the operation of the hydrogen cell 10 does not supply enough condensation water 13EC for a supply of hydrogen in the tank 12 produced by the electrolysis facility 11 being sufficient for the production of electricity in the cell 10 necessary for recharging batteries 31.

According to a first use of the electrochemical generating unit 1, the managing unit 2 is coupled to an intermittent electric power source 5 so that the intermittent source supplies in priority the electric equipment material 4.

The intermittent power source 5 could be a renewable energy device comprising a wind power module and a sun power module. The wind power module could comprise one or more wind power generators. The sun power module could comprise one or more photovoltaic sun panels. The unit 1 operates for overcoming a long predetermined period with no wind and sunlight, for example, of at least about 10 days, and thus an inactivity of the intermittent source 5 during which the electric equipment material 4 is first supplied by the batteries 31 or, if appropriate, by the electrochemical generating unit 1 when the batteries are to be recharged.

According to a second use, the intermittent power source 5 is a local distribution network of electric energy, and the electrochemical generating unit 1 with the batteries 31 operates as an emergency electric generator should the local electric network becomes defective for continuing to supply the equipment material 4. The failure of the local electric network could result from a more or less frequent failure, but also from a damage to the network resulting from a natural disaster, such as a storm, an earthquake or a tsunami.

For such uses, the managing unit 2 could comprises switches connected to the intermittent source 5 and to the electrochemical generating unit 1, current converters each including a charge regulator and connected to the batteries 31, to the equipment 4 and to the electrochemical generating unit 1, and a controller for controlling the switches and the converters and the unit 1 as a function of the power supplied by the source 5 and of the current consumption of the equipment 4, of the batteries 31 and the electrolysis facility 11. The managing unit 2, which could comprise switches connected to the intermittent source 5, maintains the continuity of the electric supply of the equipment material 4 so as to make use as little as possible of the electrochemical generating unit 1 for supplying the equipment material 4 and the unit 2, thereby increasing the lifetime of the electrochemical generating unit and the autonomy of the supplying system 1-5 and reducing the maintenance thereof, and to make use as much as possible of the intermittent source 5 and of the batteries 31 for supplying the equipment. Indeed, the lifetime of the hydrogen cell included in the generating unit is independent from the power it delivers, but depends on the activation-deactivation number of the cell, while a battery has a long lifetime, up to several years, even if it is submitted to a very high number of charge and discharge cycles. The above mentioned conditions also decrease the frequency of the maintenance of the supplying system, in particular of the electrochemical generating unit.

On the one hand, the electrolysis facility 41 neither produces nor stocks hydrogen in the tank 42 when the electrolysis facility, the equipment material 4 and the unit 2 are supplied by the intermittent source 5 only if the following very particular dual condition is met: the power of the intermittent source 5 exceeds the operating power of the equipment and the batteries 31 have a power at least equal to a first power threshold, such as a full charge threshold.

On the other hand, destocking hydrogen from the tank 12 toward the cell 10 and simultaneously supplying the equipment 4 and the unit 2 by the cell and charging the batteries 31 by the cell 10 are only achieved when the power of the batteries reaches a second power threshold, such as a discharge power, being lower to the first threshold and until the batteries charged by the cell reach the full charge power.

Outside the particular conditions, as defined hereinabove, the equipment 4 and the unit 2 are supplied by the source 5 and/or the batteries 31 as long as the power of the batteries remains included between the only two power thresholds, without making use of the power stocked in the tank 12 and therefore, of the power generated by the cell 10. When the power of the intermittent source 5 exceeds the operating power of the equipment 4 and the batteries 31 have not the full charge power, the intermittent source supplies the equipment 4 and the managing unit 2 and charges the batteries 31 if needed. When the power of the intermittent source 5 is lower than the operating power of the equipment 4 and the batteries 31 have a power being higher than the second threshold power, that is included between the discharge threshold and the full charge power, at least the batteries 31, that is the batteries 31 and the intermittent source 5, or only the batteries 31 if the power of the source is nil, supply the equipment 4 and the managing unit 2.

In order to increase the life of the supplying system, the batteries 31 could be of the lithium-ion type, so as to provide a lifetime of several years, with a very large number of charge-discharge cycles of the batteries.

In an alternative, the electrochemical generating units 1 managed by the managing unit 2 could be connected in parallel. The number of units 1 depends on the capacity of the batteries and the wanted velocity of the recharge of the batteries by the hydrogen cells included in the electrochemical generating units. Alternatively, a hydrogen stocking tank, a condenser, a water tank-collector and a water purifier are common to the units 1, each comprising an individual hydrogen cell 10 and an individual electrolysis facility 11.

The invention claimed is:

1. An electrochemical generating unit comprising a hydrogen cell and a stocking tank adapted to stock hydrogen into a hydride for destocking the hydrogen toward the hydrogen cell, said unit comprising:
   a condenser having an air intake inlet for admitting water vapor from ambient air;
   a heat exchanger disposed in the condenser and being in contact with the hydride in the stocking tank and the water vapour in the condenser;
   a convection means disposed in the condenser; and,
   means for cooperating with the stocking tank to simultaneously transfer heat of the water vapour to an endothermic reaction of the hydride into an alloy and into hydrogen utilizing the convection means to force the water vapour onto the heat exchanger, and to condense using the condensor, steam of the water vapour into condensation water.

2. The unit according to claim 1, further comprising:
   a water tank-collector adapted to collect the condensation water, and,
   an electrolysis facility adapted to be electrically supplied for producing the hydrogen to be stocked into the hydride in the stocking tank through electrolysis of the collected condensation water.

3. The unit according to claim 2, further comprising a purifier adapted to purify the collected condensation water into purified water to be supplied to the electrolysis facility.

4. The unit according to claim 1, wherein the convection means in the condenser is configured to force water vapour and hot water vapour evolved from the hydrogen cell onto the heat exchanger.

5. The unit according to claim 1, wherein the cell is configured to supply electricity to charge batteries of the cell while destocking hydrogen as soon as a power level of the batteries is at a first power threshold and until the batteries charged by the cell reach a second power threshold higher than the first threshold.

* * * * *